United States Patent [19]

Nielsen

[11] Patent Number: 6,021,435
[45] Date of Patent: *Feb. 1, 2000

[54] APPARATUS AND METHOD FOR DISPLAYING ENHANCED HYPERTEXT LINK ANCHOR INFORMATION REGARDING HYPERTEXT PAGE AVAILABILITY AND CONTENT

[75] Inventor: Jakob Nielsen, Atherton, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/615,654

[22] Filed: Mar. 13, 1996

[51] Int. Cl.[7] .................................................. G06F 15/00
[52] U.S. Cl. .......................... 709/224; 345/335; 345/357
[58] Field of Search ........................... 395/200–211, 335, 395/793, 200.54; 345/335, 793, 357; 709/224

[56] References Cited

U.S. PATENT DOCUMENTS

| | | | |
|---|---|---|---|
| 4,734,858 | 3/1988 | Schlafly | 235/380 |
| 4,905,163 | 2/1990 | Garber et al. | 395/63 |
| 5,297,249 | 3/1994 | Bernstein et al. | 395/356 |
| 5,339,414 | 8/1994 | Chana et al. | 395/250 |
| 5,537,526 | 7/1996 | Anderson et al. | 707/515 |
| 5,572,643 | 11/1996 | Judson | 395/793 |
| 5,603,025 | 2/1997 | Tabb et al. | 707/2 |
| 5,625,781 | 4/1997 | Cline et al. | 395/335 |
| 5,708,825 | 1/1998 | Sototmayor | 707/501 |
| 5,745,360 | 4/1998 | Leone et al. | 707/513 |
| 5,745,372 | 4/1998 | Fluegge | 364/489 |
| 5,761,683 | 6/1998 | Logan et al. | 707/513 |

OTHER PUBLICATIONS

M. Albers and E. Bergman, "The Audible Web: Auditory Enhancements for WWW Browsers," Available on May 15, 1995 on the World Wide Web at http://www.isye.gatech.edu/chmsr/Mike_Albers/papers/WWW/WWW–AW.html.

M. Albers and E. Bergman, "The Audible Web: Auditory Enhancements for Mosaic," Available on May 15, 1995 on the World Wide Web at http://www.isye.gatech.edu/chmsr/Mike_Albers/papers/CHI95/CHI_AW_sp.html.

M. Albers," The Audible Web," Available on May 15, 1995 on the World Wide Web at http://www.isye.gatech.edu/chsmr/Mike_Albers/projects/AW/AudibleWeb.html.

CE software Inc. (Applications software pkgs.; WebArranger 2.0) p. 1–2, Feb. 20, 1996.

*Primary Examiner*—Meng-Ai T. An
*Assistant Examiner*—Gautam R. Patel
*Attorney, Agent, or Firm*—Townsend and Townsend and Crew LLP

[57] ABSTRACT

A hypertext browsing system collects information about availability of links and display this link availability information. A user can then readily determine whether the target of a particular link may be followed. This increases the efficiency of user browsing in that time is not wasted in following unavailable links. Also, the hypertext browsing system may collect information about the titles of link targets and display this title information. The title information helps a user decide whether a particular link is worth following.

37 Claims, 6 Drawing Sheets

Sun Microsystems February 1996 — 200

Our cover story this month:

BLUE — Where the Network is Going... — 202
(Around the World in 24 Hours)

Our Feature Stories this month:

BLUE — 202
(The Future as Envisioned by SunLabs)

VIOLET — 204 — 202
(The SunExpress Web Site) A Natural Extension of Customer-Focused Technology BLUE — 202
Visit (SunWorld Online) magazine - it's hot!

BLUE — 208
(What's New!) — 202
— 206

BLUE — 202
(Products and Solutions)

BLUE — 202
(Sales and Service)

BLUE — 202
(Technology and Developers)

BLUE — 202
(Corporate Overview)

— BLUE
(Sun on the Net) — 202

— BLUE
(Search) — 202

— BLUE
(Back Issues) — 202

A version of this page with nice (graphics) is available.
BLUE — 202

Questions or comments regarding this service? (webmaster@sun.com) — 202
BLUE — 202         BLUE
(Copyright) 1996 Sun Microsystems, Inc., 2550 Garcia Ave., Mtn. View, Ca 94043-1100 USA. All Rights Reserved http://www.sun.com/960201/whatshappening.html — 210

FIG. 2. (PRIOR ART)

Sun Microsystems February 1996 ⟋200

*Our cover story this month:*

BLUE — Where the Network is Going... ⟋202
Around the World in 24 Hours

*Our Feature Stories this month:*

BLUE ⟋202
The Future as Envisioned by SunLabs

VIOLET ⟋202
The SunExpress Web Site — A Natural Extension of Customer-Focused Technology ⟋302
Visit SunWorld Online magazine - it's hot!

BLUE ⟋202
What's New! — 208
— 206

BLUE ⟋202
Products and Solutions

BLUE ⟋202
Sales and Service

BLUE ⟋202
Technology and Developers

BLUE ⟋202
Corporate Overview

BLUE
Sun on the Net — 202

BLUE
Search — 202

BLUE
Back Issues — 202

A version of this page with nice graphics is available.
BLUE ⟋ 202

Questions or comments regarding this service? webmaster@sun.com — 202
BLUE ⟋202    BLUE ⟋

Copyright 1996 Sun Microsystems, Inc., 2550 Garcia Ave., Mtn. View, Ca 94043-1100 USA. All Rights Reserved
⟋210
What's Happening! Feature Stories,...(http://www.sun.com/960201/whatshappening.html)

*FIG. 3.*

APPARATUS AND METHOD FOR DISPLAYING ENHANCED HYPERTEXT LINK ANCHOR INFORMATION REGARDING HYPERTEXT PAGE AVAILABILITY AND CONTENT

BACKGROUND OF THE INVENTION

The present invention relates to presentation of link information in hypertext pages and particularly to presentation of such link information where documents are distributed over a network such as the World Wide Web (WWW).

Hypertext pages typically have multiple links to other pages. Each link has an associated address identifying the page that it points to. In the context of the WWW, the associated address is typically a Universal Resource Locator (URL) of another page.

For the WWW, the links are normally displayed by a browser as colored and underlined text. This text is referred to as the link anchor and is used to inform the user about the linking possibilities from the current page. By selecting the link anchor using a pointing and selecting device such as a mouse, the user retrieves the web page pointed to by the link anchor.

Currently, the color of the link anchor encodes whether the user has visited the destination page or not. Anchors for links to unvisited pages are typically blue and anchors for links to previously visited pages are typically red or purple. When a cursor is over an anchor, the browser typically displays the target URL as a footer message.

The link information presented by the typical WWW browser is however incomplete. There is no way for the user to know whether a web page that is a target of a particular link is in fact currently available. Thus time is frequently wasted in attempting to follow links to unavailable targets. This problem is exacerbated for users with slow connections to the Internet. Furthermore, although the anchors themselves often provide information about links, the URL being a coded address adds little information that would be beneficial to the user.

SUMMARY OF THE INVENTION

By virtue of the present invention, a hypertext browsing system may collect information about availability of links and display this link availability information. A user can then readily determine whether the target of a particular link may be followed. This increases the efficiency of user browsing in that time is not wasted in following unavailable links. Also, in accordance with the invention, a hypertext browsing system may collect information about the titles of link targets and display this title information. The title information helps a user decide whether a particular link is worth following.

In one embodiment particularized to the World Wide Web (WWW), once a new page is displayed, the availability of each link may be determined in turn. To determine the availability of a link, the WWW browser sends an HTTP HEAD message to the target of each link to request header information about the target. If an error reply or no reply is received, then the link is designated as being unreachable. If a reply is received, the title of the link target is extracted. The browser periodically revisits unreachable links to update their availability.

The browser indicates the unavailability of a link by changing the appearance of a displayed link anchor. For example, while link anchors for available links may be displayed as underlined text with a highlight color, link anchors for unavailable links may be displayed as underlined text but in the default text color. The title of the target of a link may be displayed in a footer message whenever a cursor travels over the associated link anchor.

In one embodiment, the browser maintains a database of unreachable link destinations. This database includes records with two fields, each record corresponding to an unreachable link destination. A first field includes the network address (URL in the WWW context). A second field includes the last time the URL had been determined to be unreachable. During periods of low load, the browser examines the database and removes any records for which the second field indicated a time more than 15 minutes before the current time. Checking the database enables the browser to display the link anchors in the notation used for unreachable anchors at an earlier time than possible when having to wait for the status of the link to be determined via the network.

Also, the browser may maintain a database of reachable link destinations. This database includes records including three fields, each record corresponding to a reachable link destination. A first record includes the network address. A second record includes a title of the link target. A third record includes the last time the link target had been determined to be reachable. During periods of low load, the browser examines the database and removes any records for which the last time field indicated a time more than 60 minutes before the current time. Checking this database enables the browsing system to add the title to the footer message faster than when having to wait for the information to be retrieved via the network.

A further understanding of the nature and advantages of the inventions herein may be realized by reference to the remaining portions of the specification and the attached drawings.

BRIEF DESCRIPTION OF THE DRAWINGS

FIG. 2 depicts a black and white rendition of a prior art WWW page display.

FIG. 3 depicts a black and white rendition of a WWW page display modified in accordance with one embodiment of the present invention.

DESCRIPTION OF SPECIFIC EMBODIMENTS

Figure 1A:
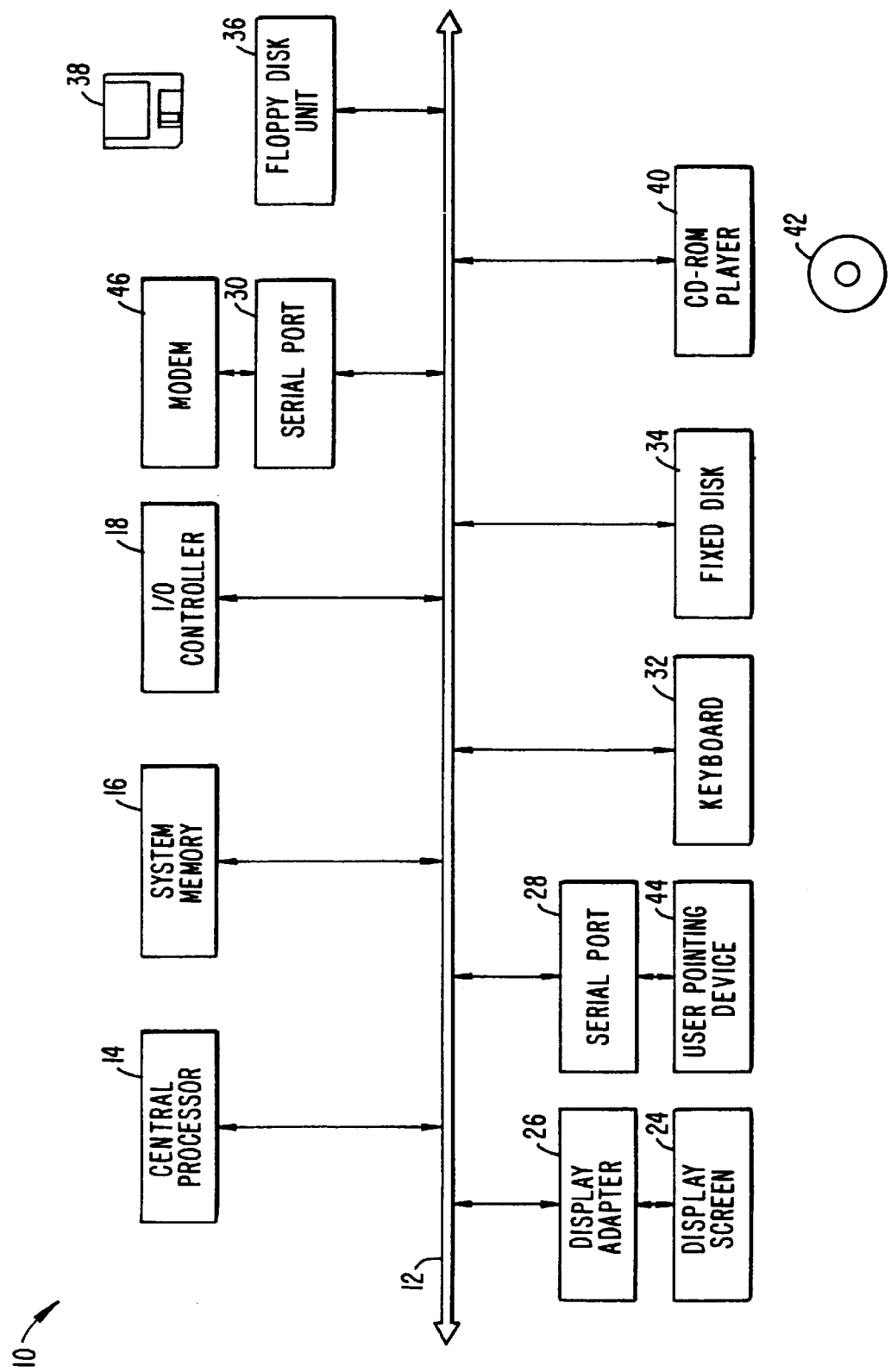
FIG. 1A depicts a block diagram of a client computer system suitable for implementing the present invention.

FIG. 1A depicts a block diagram of a client computer system 10 suitable for implementing the present invention. Client computer system 10 includes a bus 12 which interconnects major subsystems such as a central processor 14, a system memory 16 (typically RAM), an input/output (I/O) controller 18, an external device such as a display screen 24 via display adapter 26, serial ports 28 and 30, a keyboard 32, a fixed disk drive 34 and a floppy disk drive 36 operative to receive a floppy disk 38, and a CD-ROM device 40 operative to receive a CD-ROM 42. Many other devices can be connected such as a user pointing device, e.g., a mouse 44 connected via serial port 28 and a modem 46 connected via serial port 30. Modem 46 may provide a direct connection to a remote server via a telephone link or to the Internet via a POP (point of presence). Alternatively, some other type of network interface system (not shown) could be used.

Many other devices or subsystems (not shown) may be connected in a similar manner. Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention may be operably disposed in system memory 16 or stored on storage media such as fixed disk 34, floppy disk 38, or CD-ROM 42.

Figure 1B:
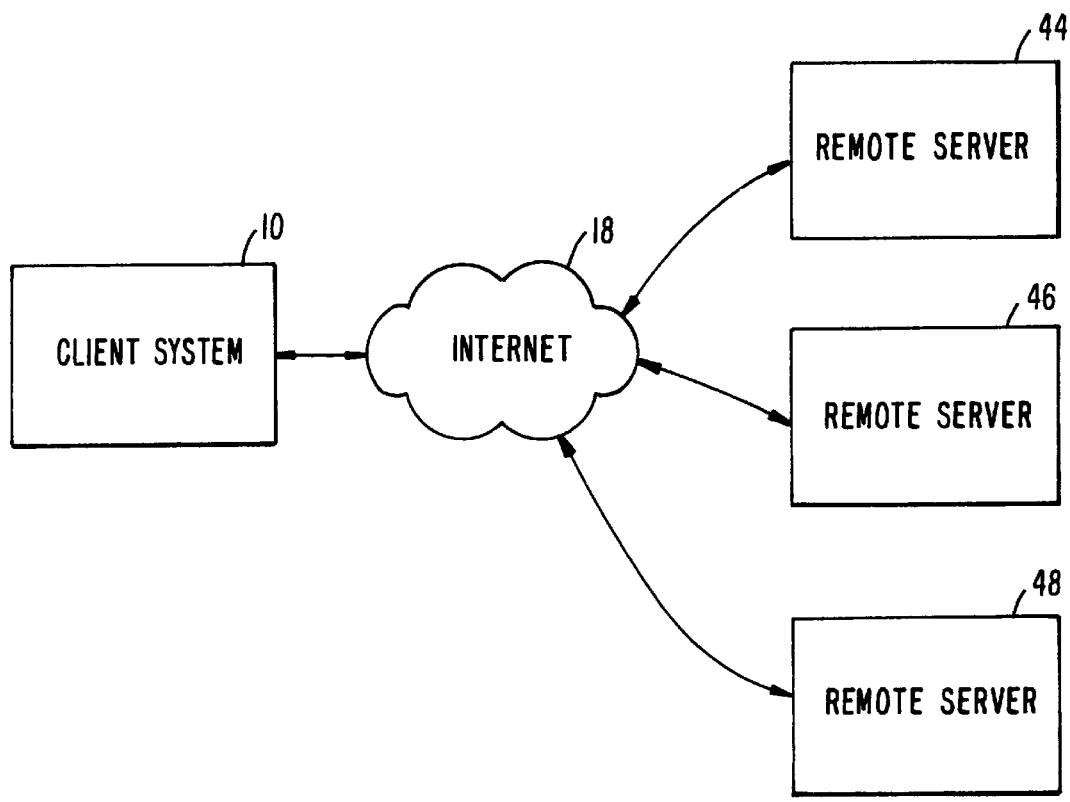
FIG. 1B depicts the interconnection of the client computer systems to remote servers.

FIG. 1B depicts the interconnection of client computer system 10 to remote servers 44, 46, and 48. FIG. 1B depicts the Internet 18 interconnecting remote servers 44, 46, and 48. Modem 42 or some other network interface system provides the connection from client computer system 10 to the Internet 50. Protocols for exchanging data via the Internet are well known and need not be discussed herein. Although FIG. 1B depicts the use of the Internet for exchanging data, the present invention is not limited to the Internet. The present invention may be implemented in the context of any network environment.

The present invention will be illustrated in the context of a system for enhancing the display of pages retrieved from the WWW by a web browsing system running on client computer system 10, preferably HotJava™, a browser available from Sun Microsystems™. Web documents may reside on remote servers 44, 46, and 48. The techniques of the present invention could be applied to any hypertext browsing system including ones functioning within the context of networks independent of the Internet or networks that do not employ HTTP.

FIG. 2 depicts a black and white rendition of a prior art WWW page display 200 as displayed by a WWW browser. The display includes multiple text link anchors 202. When the user selects a particular text link anchor with mouse 44, the browsing system responds by attempting to retrieve the page pointed to by the link anchor. In display 200, all of the link anchors 202 are shown as underlined text. Most of the link anchors 202 are depicted in blue type as distinct from the default text color, black. A particular link anchor 204 is shown in violet to indicate that it points to a web site that has already been visited. A pointer 206 is shown located over a particular link anchor 208. A footer message 210 shows the Universal Resource Locator (URL) of link anchor 208.

FIG. 3 depicts a black and white rendition of WWW page display 200 of FIG. 2 enhanced in accordance with one embodiment of the present invention. Corresponding elements are assigned the same reference designator as in FIG. 2. The enhanced version of display 200 shows a particular link anchor 302 underlined but in the default text color, black. This indicates that the browsing system of the invention has determined that the target of link anchor 302 is unreachable. Therefore, the user will not waste time by selecting link anchor 302, only to receive an error message. Alternatively, a special color could indicate that a link anchor is unreachable.

Footer message 210 is enhanced to show the title of the web page that is the target of link anchor 208. Preferably, footer message 210 shows the title first with the URL in parentheses. However, the user may set a preference so that the URL is displayed first with the title in parentheses. Thus, by passing pointer 206 over a link anchor, the user may view the title of the target page. The title is more readable and a better guide to the utility of the target page than the URL.

In one embodiment, the browser maintains a database of unreachable link destinations. This database includes records with two fields, each record corresponding to an unreachable link destination. A first field includes the network address (URL in the WWW context). A second field includes the last time the URL had been determined to be unreachable. During periods of low load, the browser examines the database and removes any records for which the second field indicated a time more than 15 minutes before the current time. Checking the database enables the browser to display the link anchors in the notation used for unreachable anchors at an earlier time than possible when having to wait for the status of the link to be determined via the network.

Also, the browsing system may maintain a database of reachable link destinations. This database includes records including three fields, each record corresponding to a reachable link destination. A first record includes the network address. A second record includes a title of the link target. A third record includes the last time the link target had been determined to be reachable. During periods of low load, the browsing system examines the database and removes any records for which the last time field indicated a time more than 60 minutes before the current time. Checking this database enables the browsing system to add the title to the footer message faster than when having to wait for the information to be retrieved via the network.

Figure 4:
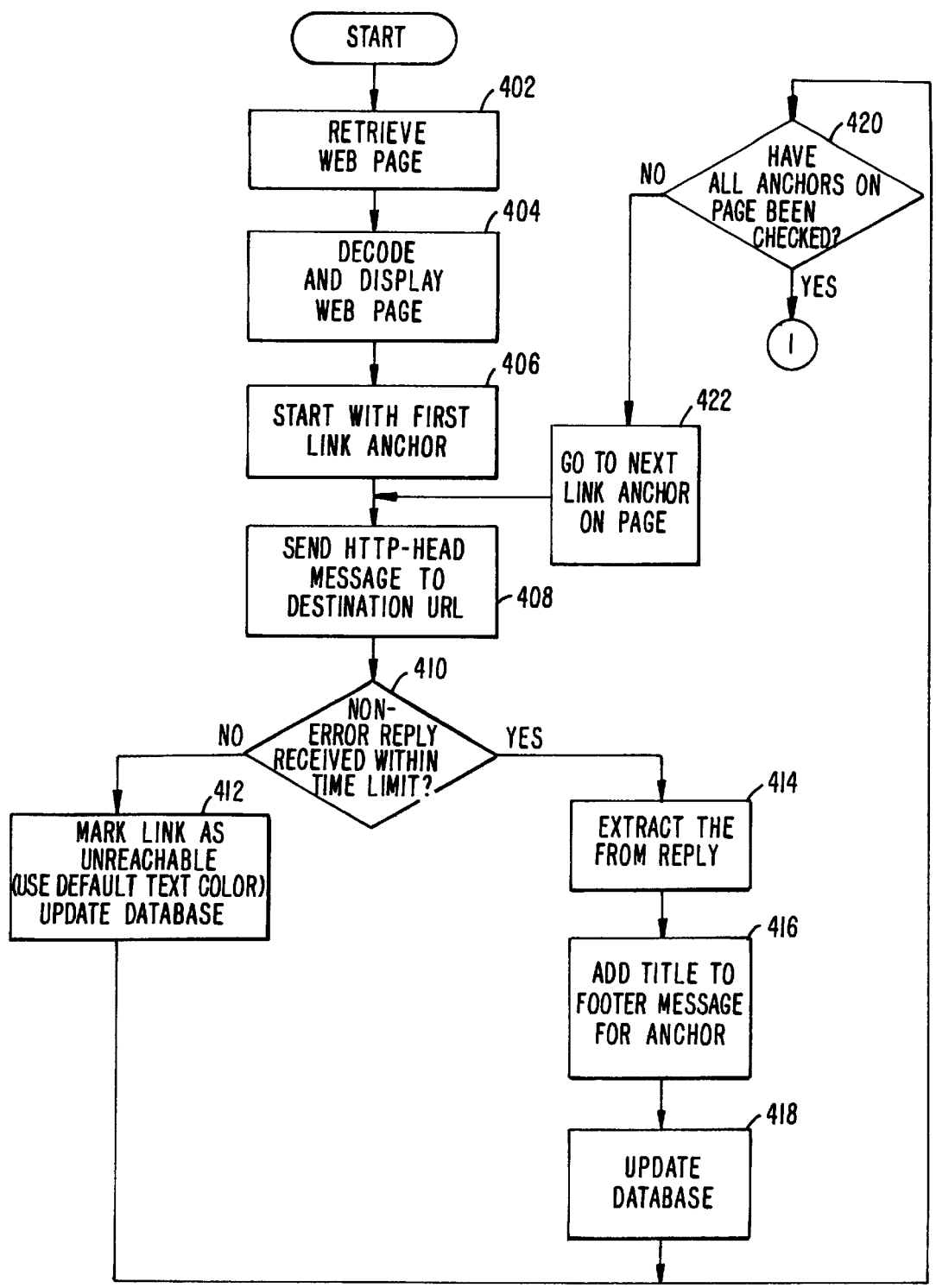
FIG. 4 depicts a flowchart describing steps of collecting and displaying link information in accordance with one embodiment of the present invention.

FIG. 4 depicts a flowchart describing steps of enhancing the user's prospective view of link information in accordance with one embodiment of the present invention. At step 402, the browsing system retrieves a web page in HTML format. At step 404, the browsing system decodes the HTML web page data and displays it. The display generated by the browsing system highlights text link anchors by underlining the text and displaying it in a special color different from the default text color. For embodiments that maintain a database of unreachable links, the browsing system checks the link anchors of the page against the database of unreachable links. If a link is noted in the database to be unreachable in the last fifteen minutes, it is assumed to be unreachable now and its link anchor is displayed underlined but in the default text color.

At step 406, the browsing system begins its examination of each link anchor on the page, starting with the first link anchor. At step 408, the browsing system sends an HTTP HEAD message to the target of the link anchor being examined. This message requests a header of the target web page.

At step 410, the browsing system awaits a reply to the HTTP HEAD message. If an error message is received in reply or no reply is received within a predetermined time period, preferably one minute, the browsing system designates the currently examined link anchor to be unreachable at step 412. Furthermore, if the URL of the link anchor is in the optional database of unreachable links, the time field of the record associated with the link is reset to the current time. Preferably, an unreachable link anchor is shown in the default text color, but still underlined to show that it represents a possible link. Users may set a preference option to display unreachable link anchors in a special color. This option may be desirable for debugging, for example.

If a non-error reply is received, the browsing system attempts to extract a title from the page header received in reply at step 414. If a title is found, it is added to a preview message for the anchor at step 416. Preferably when a pointer passes over the link anchor, the preview message is displayed at the bottom of a page as part of a footer. The user may set a preference to display the title with the URL following in parentheses or alternatively to display the URL with the title in parentheses. Then, at step 418, the optional database of reachable links is checked for this URL. If the URL is there, the time field is set to the current time. If the URL is not there, a new record is added for it the time field set to the current time. The title field is set to be the title extracted from the reply at step 414.

After either step 416 or step 412, the browsing system checks if each link anchor on the page has been visited at step 420. If each web anchor on the page has not been checked, the browsing system finds the next link anchor on the page at step 422. This link anchor is then examined in the same way beginning at step 408. If each link anchor on the page has already been checked, the browsing system proceeds to revisit anchors marked to be unreachable according to the steps shown in the flowchart of FIG. 5.

Figure 5:
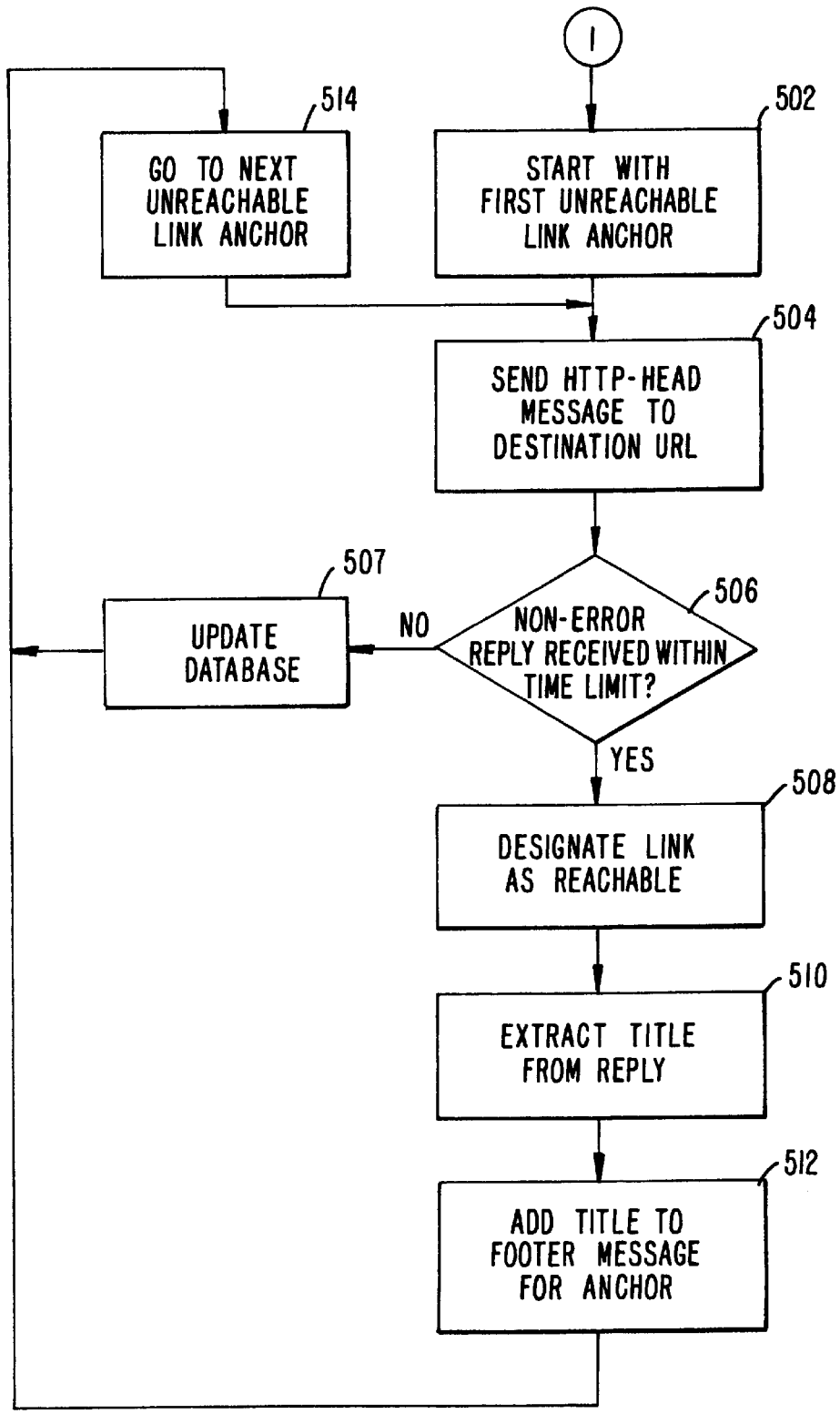
FIG. 5 depicts a flowchart describing steps of collecting and displaying link information for links previously found to be unreachable in accordance with one embodiment of the present invention.

FIG. 5 depicts a flowchart describing steps of collecting and displaying link information for links previously found to be unreachable in accordance with one embodiment of the present invention. At step 502, the browsing system begins its reexamination of previously visited link anchors beginning with the first link anchor on the page previously designated to be unreachable. At step 504, the browsing system once again sends an HTTP HEAD message to the destination of the currently examined link anchor. The browsing system awaits a reply at step 506.

If no reply is received, the browser sets the time field in the optional unreachable link database record for this URL to be the current time at step 507. If a reply is now received, the link anchor is redesignated as reachable at step 508, preferably by changing its color back to the highlight color. Then at step 510, if a title is found in the reply it is extracted. The optional database of reachable links is checked for this URL. If the URL is there, the time field is set to the current time. If the URL is not there, a new record is added for it the time field set to the current time. The title field is set to be the extracted title. At step 512, the browsing system adds the title to the footer message.

After step 507 or 512, the browsing system proceeds to step 514 to find the next unreachable link anchor. The examination of this unreachable link anchor then begins at step 504.

Preferably, the procedure of FIG. 5 repeats so that each unreachable link anchor is revisited approximately every five minutes. It has been found that second attempts to contact a given target are often successful. The browsing system may also use available time to recheck links previously found to be reachable to make sure that they are still reachable.

The enhanced browsing system of the present invention thus makes effective use of time that a user is viewing a single page to enhance the prospective link information displayed on that page. The user need not waste time in following unavailable links. Furthermore, the title information displayed in the footer helps the user determine if a given link is worth following.

In the foregoing specification, the invention has been described with reference to specific exemplary embodiments thereof. It will, however, be evident that various modifications and changes may be made thereunto without departing from the broader spirit and scope of the invention as set forth in the appended claims. For example, information concerning the availability of links from a hypertext page could be collected even where the hypertext page is not itself displayed. This type of embodiment might support a web search system or an autonomous agent that searches for information in a network.

Furthermore, the flowcharts described herein are illustrative of merely the broad logical flow of steps to achieve a method of the present invention and that steps may be added to, or taken away from, the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java scripting language, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

What is claimed is:

1. In a hypertext browsing system wherein hypertext pages are displayed with a plurality of link anchors, each of said link anchors pointing to another hypertext page by specifying a network address, a method for providing an enhanced display of said link anchors comprising the steps of:

automatically sending a first message to a first network address specified by a selected link anchor on a selected hypertext page;

if a hypertext page pointed to by said selected link anchor is determined to be available, designating said selected link anchor as being reachable by a visual representation of said selected link anchor; and automatically sending a further message to a second network address specified by a second selected link to determine an availability of said second selected link anchor.

2. The method of claim 1 further comprising the steps of automatically sending messages to all link anchors on said selected hypertext page and designating each of said all link anchors as being in one of two states, said states being reachable and unreachable.

3. The method of claim 1 further comprising the steps of:

if said first selected link anchor is designated as being unreachable, automatically sending a second message to said first network address; and upon receiving a reply to said second message, designating said first selected link anchor as being reachable.

4. The method of claim 3 further comprising the step of periodically repeating said step of automatically sending a second message.

5. The method of claim 3 wherein said first selected link anchor is determined to be unreachable if no reply or an error reply to said message is received.

6. The method of claim 1 wherein said selected hypertext page is currently displayed.

7. The method of claim 1 wherein said hypertext browsing system is an HTTP browser.

8. The method of claim 7 wherein said first message is an HTTP HEAD message.

9. The method of claim 1 further comprising the step of: if a reply to said first message is received, extracting a title from said reply.

10. The method of claim 9 further comprising the step of: when a pointer passes over said first selected link anchor, displaying said title.

11. The method of claim 9 further comprising the step of: if a reply to said first message is received, storing said title and said network address.

12. The method of claim 11 further comprising the step of: if a reply to said first message is received, storing a current time along with said title and said network address.

13. The method of claim 1 wherein said designating step comprises storing said first network address and a current time.

14. The method of claim 1 wherein visual representation comprises changing a color of said first selected link anchor.

15. The method of claim 14 wherein said color comprises a default text color.

16. A computer system comprising:
a network interface system adapted to access hypertext pages via a network;
a hypertext browsing system wherein hypertext pages are displayed with a plurality of link anchors, each of said link anchors pointing to another hypertext page by specifying a network address, said hypertext browsing system performing the steps of:
automatically sending a first message to a first network address specified by a selected link anchor on a selected hypertext page;
if a hypertext page pointed to by said selected link anchor is determined to be available, designating said selected link anchor as being reachable by changing a visual representation of said selected link anchor; and
automatically sending a further message to a second network address specified by a second selected link anchor to determine an availability of said second link anchor.

17. The computer system of claim 16 further performs the steps of:
if said first selected link anchor is designated as being unreachable, automatically sending a second message to said network address; and
if a reply to said second message is received, designating said first selected link anchor as being reachable.

18. The computer system of claim 17 wherein said first selected link anchor is determined to be unreachable if no reply or an error reply to said second message is received.

19. The computer system of claim 16 wherein said selected hypertext page is currently displayed by said hypertext browsing system.

20. The computer system of claim 19 wherein changing a visual representation of said first selected link anchor comprises changing a color of said selected link anchor.

21. The computer system of claim 20 wherein changing a color of said first selected link anchor comprises changing said color to a default text color.

22. Software on a storage medium, for operation with a hypertext browsing system wherein hypertext pages are displayed with a plurality of link anchors, each of said link anchors pointing to another hypertext page by specifying a network address, said software comprising:
software for automatically sending a first message to a first network address associated with a selected link anchor on a hypertext page that has been retrieved by said hypertext browsing system;
software for if a hypertext page pointed to by said first selected link anchor is determined to be available, designating said selected link anchor as being reachable by changing a visual representation of said selected link anchor; and
software for automatically sending a further message to a second network address associated with a second selected link anchor to determine an availability of said second selected link anchor.

23. The software of claim 22 further comprising:
software for repeatedly applying said sending software and said designating software for all link anchors on said selected hypertext page.

24. The software of claim 22 further comprising:
software for if said first selected link anchor is designated as being unreachable, automatically sending a second message to said network address; and
upon receiving a reply to said second message, designating said first selected link anchor as being reachable.

25. The software of claim 22 further comprising:
software for periodically applying said software for automatically sending said further message.

26. The software of claim 22 wherein said selected hypertext page is currently displayed.

27. The software of claim 26 wherein said hypertext browsing system is an HTML browser and said message is an HTTP HEAD message.

28. The software of claim 22 further comprising:
software for if a reply to said first message is received, extracting a title from said reply.

29. The software of claim 28 further comprising:
software for when a pointer passes over said first selected link anchor, displaying said title.

30. The software of claim 28 further comprising:
software for if a reply to said first message is received, storing said title and said first network address.

31. The software of claim 28 further comprising:
software for if a reply to said first message is received, storing a current time along with said title and said first network address.

32. The software of claim 22 wherein changing a visual representation comprises changing a color of said first selected link anchor.

33. The software of claim 32 wherein changing a color of said first selected link anchor comprises changing to a default text color.

34. The software of claim 22 wherein said designating software comprises software for storing said first network address and a current time.

35. The computer system of claim 22 wherein said first selected link anchor is determined to be unreachable if no reply or an error reply to said second message is received.

36. In a hypertext browsing system wherein a hypertext page, displays a plurality of link anchors, each of said link anchors pointing to another hypertext page by specifying a network address, a method for providing an enhanced display of said link anchors comprising the steps of:
automatically sending a message to the network address associated with each link anchor of a subset of said plurality of link anchors to determine whether data may be received therefrom;

designating each link anchor of said subset as being in one of a plurality of data communication states by changing a visual representation of said selected link anchor, said plurality of data communication states including available and unavailable, with visual representations associated with the available communication state being distinguishable from representations associated with the unavailable state; and repeating said automatically sending step and said designating step for anchors having an unavailable state associated therewith.

37. The method of claim 36 wherein said repeating step further includes repeating said automatically sending step and said designating step for all of said plurality of link anchors on said selected hypertext page.

* * * * *

UNITED STATES PATENT AND TRADEMARK OFFICE
CERTIFICATE OF CORRECTION

PATENT NO. : 6,021.435
DATED : February 1, 2000
INVENTOR(S) : Jakob Nielsen

It is certified that error appears in the above-identified patent and that said Letters Patent is hereby corrected as shown below:

In column 7, line 46, after "16", please insert the following: --wherein said hypertext display system--.

In column 8, line 45, please delete "28" and insert --30--.

Signed and Sealed this

Sixth Day of March, 2001

Attest:

NICHOLAS P. GODICI

Attesting Officer     Acting Director of the United States Patent and Trademark Office